US011619348B2

(12) United States Patent
Wang

(10) Patent No.: US 11,619,348 B2
(45) Date of Patent: Apr. 4, 2023

(54) LUBRICATION SYSTEM

(71) Applicant: Guo-Wei Wang, Taichung (TW)

(72) Inventor: Guo-Wei Wang, Taichung (TW)

(*) Notice: Subject to any disclaimer, the term of this patent is extended or adjusted under 35 U.S.C. 154(b) by 216 days.

(21) Appl. No.: 17/194,297

(22) Filed: Mar. 7, 2021

(65) Prior Publication Data

US 2022/0282832 A1 Sep. 8, 2022

(51) Int. Cl.
*F16N 29/04* (2006.01)
*F16N 7/38* (2006.01)
*F16N 29/02* (2006.01)

(52) U.S. Cl.
CPC ............... *F16N 29/04* (2013.01); *F16N 7/38* (2013.01); *F16N 29/02* (2013.01); *F16N 2250/40* (2013.01); *F16N 2260/30* (2013.01)

(58) Field of Classification Search
CPC ..... F16N 7/38; F16N 2250/40; F16N 2260/30
USPC ......................................................... 184/6.4
See application file for complete search history.

(56) References Cited

U.S. PATENT DOCUMENTS

| 4,735,286 | A | * | 4/1988 | Miki | F16N 7/32 |
| | | | | | 184/39.1 |
| 5,038,893 | A | * | 8/1991 | Willner | F16N 29/00 |
| | | | | | 184/7.4 |
| 5,125,480 | A | * | 6/1992 | Gregory | F16N 29/00 |
| | | | | | 184/6.26 |
| 6,145,626 | A | * | 11/2000 | Niemczura, Sr. | F16N 29/00 |
| | | | | | 184/55.1 |
| 7,806,235 | B1 | * | 10/2010 | Roys | F16N 13/02 |
| | | | | | 184/26 |
| 2009/0014245 | A1 | * | 1/2009 | Shevchenko | F02C 7/06 |
| | | | | | 73/112.01 |
| 2012/0145482 | A1 | * | 6/2012 | Ifield | F16N 7/385 |
| | | | | | 184/6 |
| 2013/0008745 | A1 | * | 1/2013 | Barrett | F16N 29/04 |
| | | | | | 137/595 |
| 2014/0090929 | A1 | * | 4/2014 | Powell | F16N 29/04 |
| | | | | | 184/6 |

* cited by examiner

Primary Examiner — Michael R Mansen
Assistant Examiner — Mark K Buse

(57) ABSTRACT

A lubrication system includes a lubricator. A detecting unit includes an oil introducing part, multiple chambers, multiple blockage detectors and a processor. The oil introducing part is connected between the detecting unit and the lubricator. The oil introducing part communicates with the chambers. The blockage detectors are electrically connected to the processor and monitor transportation status of lubrication oil of the chambers. The processor judges the transportation status of the lubricating oil of the chambers by results from the blockage detectors. The lubrication system finds out blockage in the oil paths immediately so as to remove the blockage timely.

11 Claims, 9 Drawing Sheets

LUBRICATION SYSTEM

BACKGROUND OF THE INVENTION

1. Fields of the Invention

The present invention relates to a lubrication system, and more particularly, to a lubrication system with features of blockage detection and blockage removal.

2. Descriptions of Related Art

Lubricating oil is an essential element for machine operation. The conventional way for providing lubricating oil to the machine is to use a lubricator.

It is not an easy task to supply lubricating oil continuously and stably during operation of machine. The lubricating oil provided to machine cannot contain air in the path for transportation of the lubricating oil, because air in the path may affect the desired amount of the lubricating oil to be sprayed to the machine.

Compared to the problem of air in the path, the more serious problem is blockage in the path. If the oil path is blocked, the lubricating oil cannot be supplied to the machine. However, the lubrication system is still in operation even when the oil path is blocked. Generally, the blockage in the oil path is found when a large number of abnormalities found in the processed product. Then the machine is stopped to check each of the oil paths to find out where the blockage exists. After the blockage in the oil path is removed, the lubricating oil is able to be supplied to the machine.

For the conventional lubrication system, there are two problems need to be improved. The first is that the blockage in the oil paths cannot be found immediately. The second is that the machine has to be stopped to find out the blockage and to remove the blockage.

The present invention intends to provide a lubrication system to eliminate the shortcomings mentioned above.

SUMMARY OF THE INVENTION

The present invention relates to a lubrication system and comprises a lubricator. A detecting unit includes an oil introducing part, multiple chambers, multiple blockage detectors and a processor. The oil introducing part is connected between the detecting unit and the lubricator. The oil introducing part communicates with the chambers. The blockage detectors are electrically connected to the processor and monitor transportation status of lubrication oil of the chambers. The processor judges the transportation status of the lubricating oil of the chambers by results from the blockage detectors.

This application provides another aspect of the lubrication system of the present invention, and comprises a lubricator. A blockage removal unit includes an air compressor and a box. The box includes multiple air inlets and multiple oil paths. A check valve is connected between each air inlet and each oil path. Each oil path includes a first end connected to lubricator, and a second end of each oil path includes an oil outlet.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
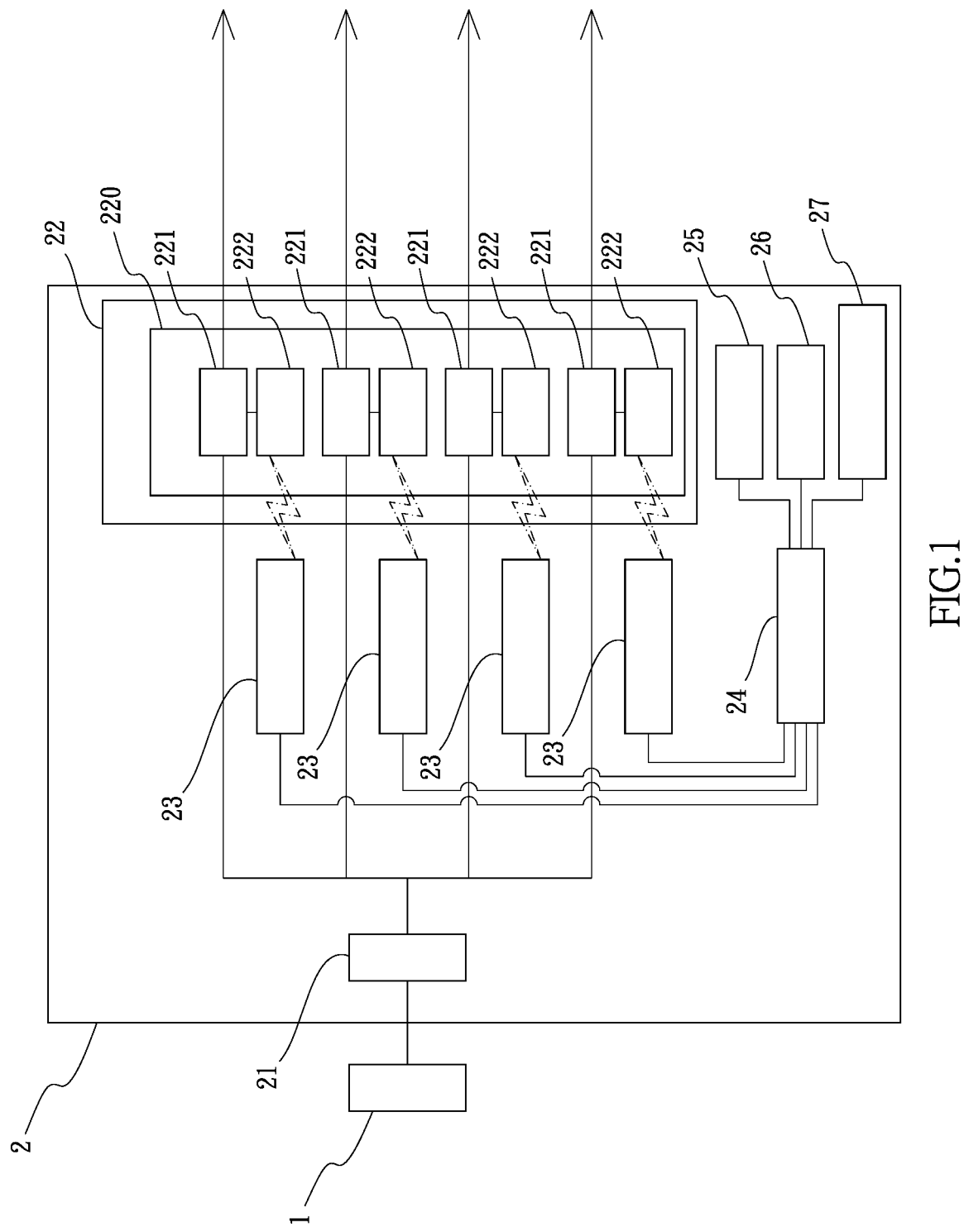
FIG. 1 is a block diagram of the lubrication system of the present invention.

Referring to FIG. 1, the lubrication system of the present invention comprises a lubricator 1 and a detecting unit 2. The detecting unit 2 includes an oil introducing part 21, multiple chambers 221, multiple blockage detectors 23 and a processor 24. The oil introducing part 21 is connected between the detecting unit 2 and the lubricator 1. The oil introducing part 21 communicates with the chambers 221. The blockage detectors 23 are electrically connected to the processor 24 and monitor transportation status of lubrication oil of the chambers 221. The processor 24 judges the transportation status of the lubricating oil of the chambers 221 by the results from the blockage detectors 23. The abnormal transportation status of the lubricating oil of the chambers 221 means at least one of the oil paths is blocked. Therefore, the blockage can be acknowledged immediately.

Figure 3:
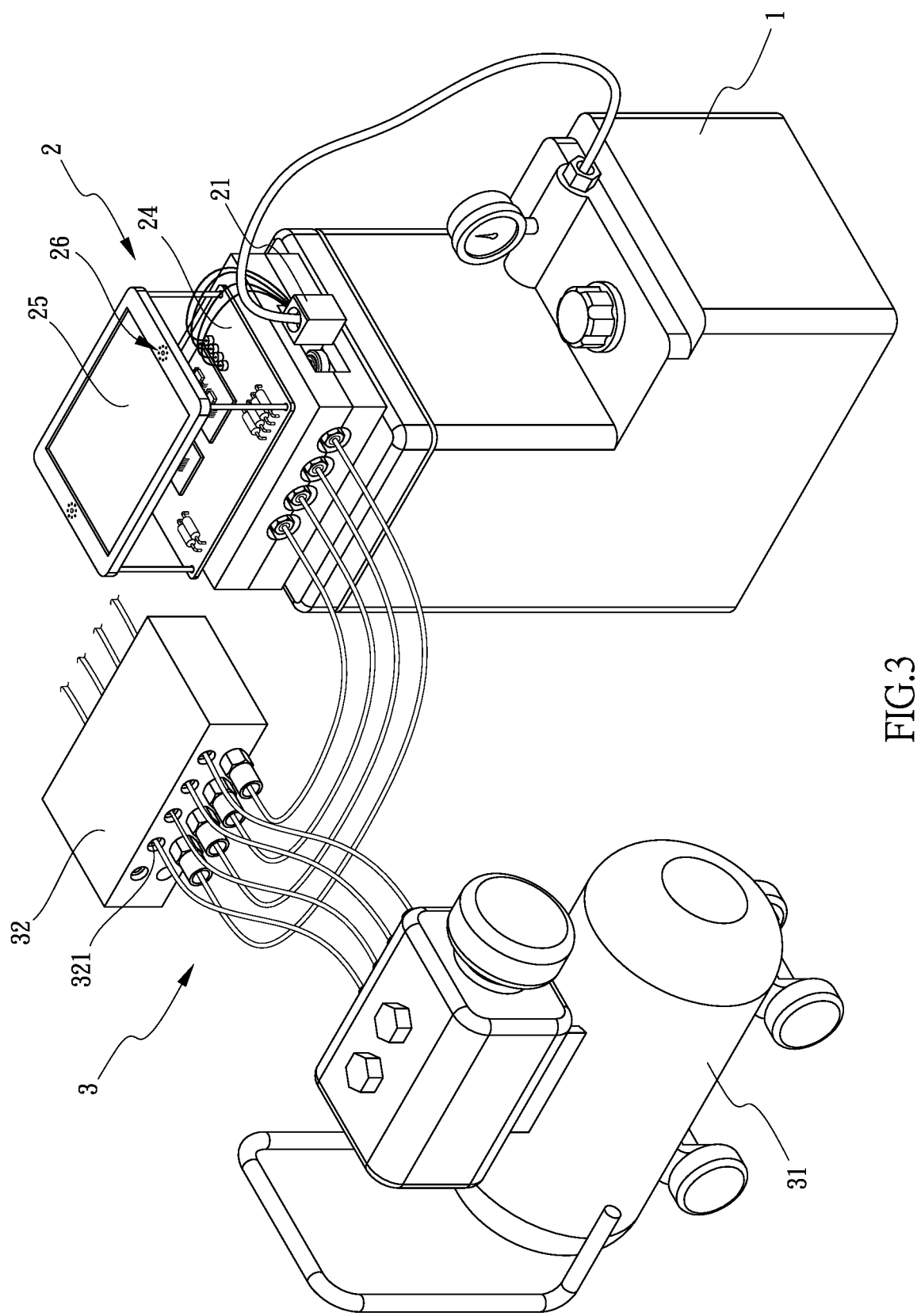
FIG. 3 is a perspective view to show the lubrication system of the present invention.
Figure 4:
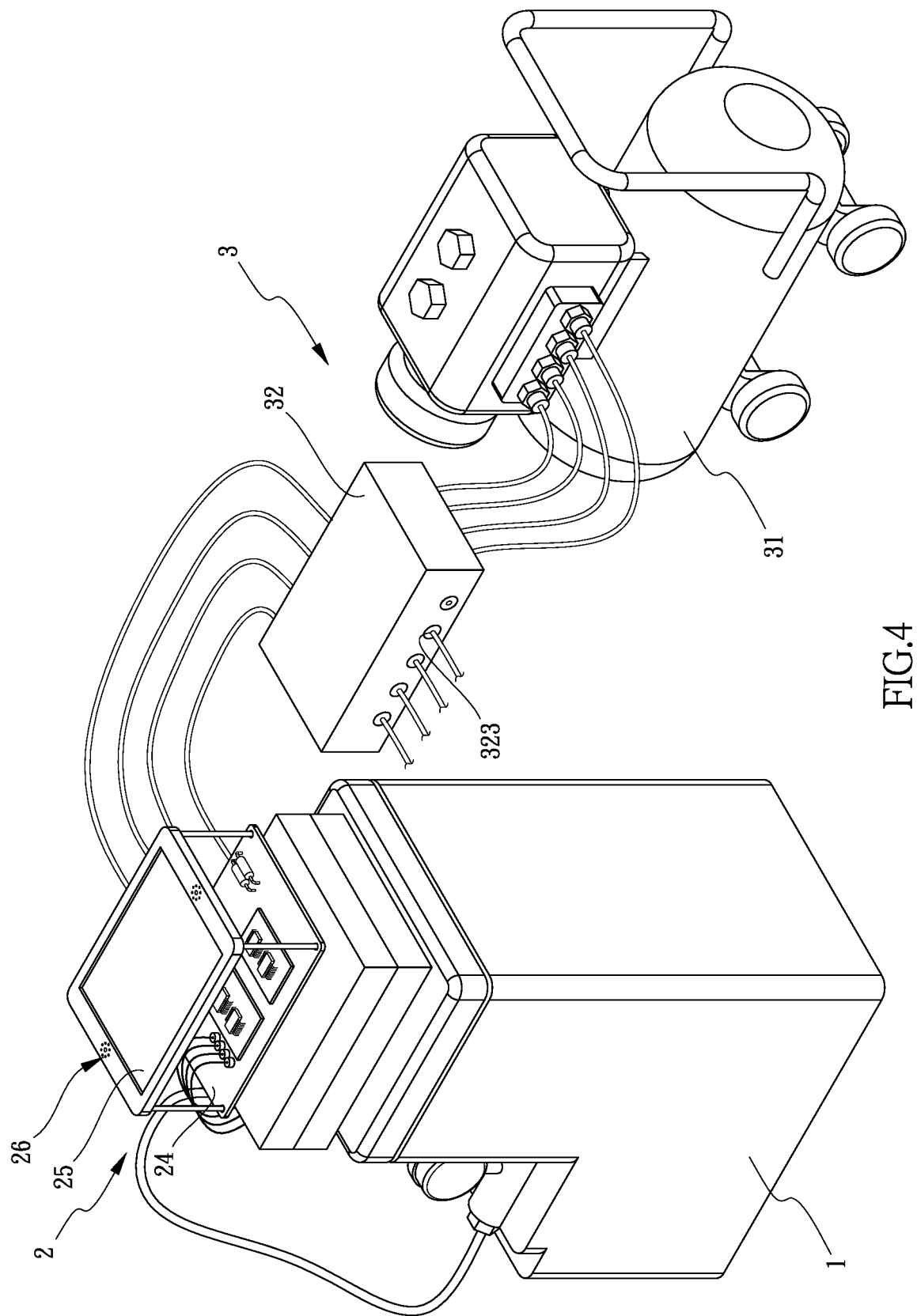
FIG. 4 is another perspective view to show the lubrication system of the present invention.
Figure 5:
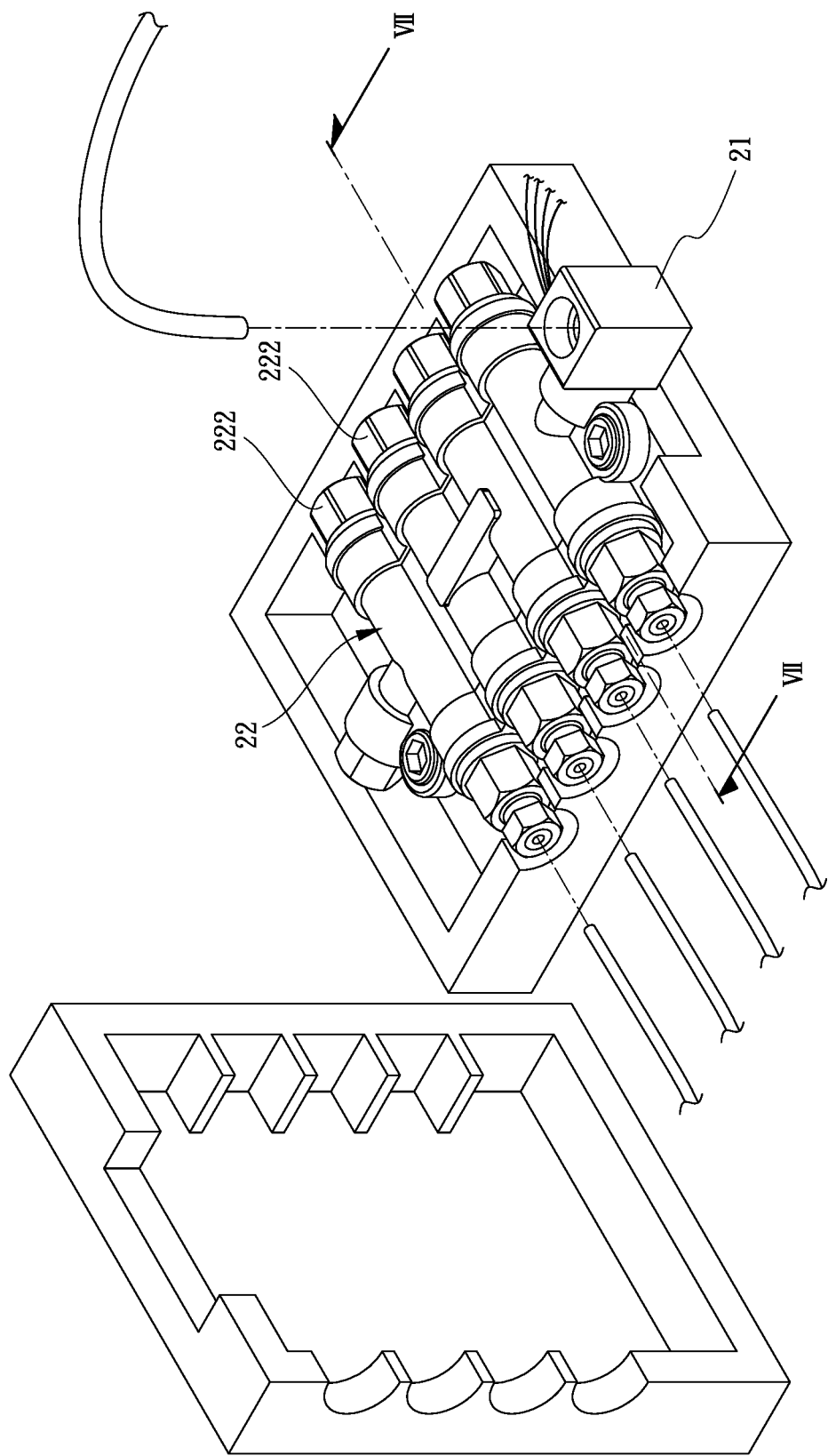
FIG. 5 is an exploded view of the detecting unit of the present invention.
Figure 9:
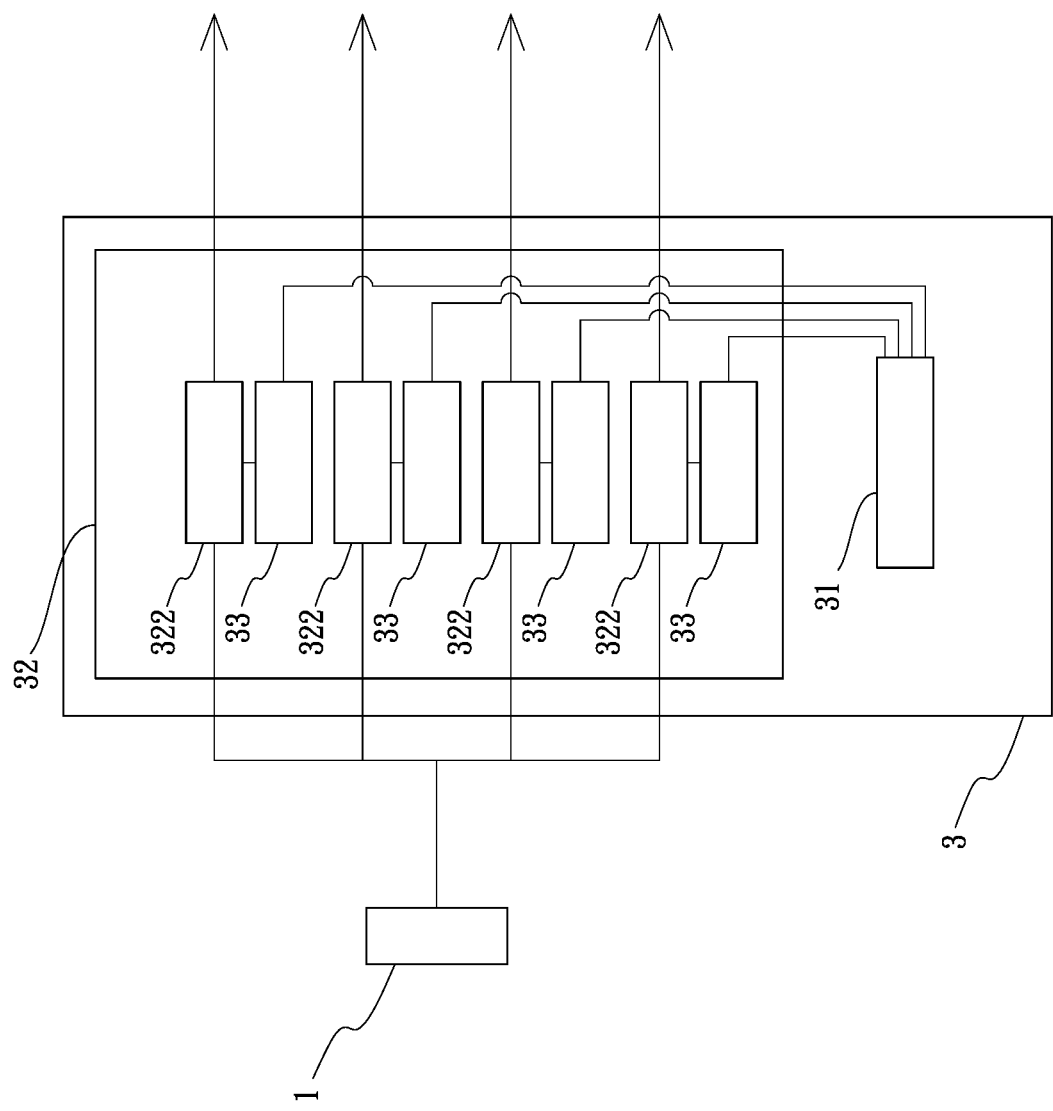
FIG. 9 is a block diagram of another embodiment of the present invention.

The second embodiment of the present invention relates to a lubrication system and comprises a lubricator 1 and a blockage removal unit 3 as shown in FIGS. 3, 4 and 9. The blockage removal unit 3 includes an air compressor 31 and a box 32. The box 32 includes multiple air inlets 321 and multiple oil paths 322. A check valve 33 is connected between each air inlet 321 and each oil path 322. Each oil path 322 includes the first end connected to lubricator 1, and the second end of each oil path 322 includes an oil outlet 323. The blockage removal unit 3 is connected to the machine that the lubricating oil supplies to, so that when the blockage is acknowledged, the blockage removal unit 3 removes the blockage immediately without shutting down the machine.

The lubricator 1 is able to be cooperated with the detecting unit 2 and the blockage removal unit 3.

As shown in FIGS. 2 to 8, the second embodiment of the present invention further includes a blockage removal unit 3 that communicates with the chambers 221. The blockage removal unit 3 is connected to the processor 24. When the processor 24 judges that the transportation status of the lubricating oil of one of the chambers 221 is abnormal, the processor 24 activates the blockage removal unit 3 to remove the blockage.

The second embodiment of the present invention further includes a detecting unit 2. The detecting unit 2 is connected between the lubricator 1 and the blockage removal unit 3. The detecting unit 2 includes an oil introducing part 21, multiple chambers 221, multiple blockage detectors 23 and a processor 24. The oil introducing part 21 is connected between the detecting unit 2 and the lubricator 1. The oil introducing part 21 communicates with the chambers 221. The blockage detectors 23 is electrically connected to the processor 24 and monitors transportation status of lubrication oil of the chambers 221. The processor 24 judges the transportation status of the lubricating oil of the chambers 221 by the results from the blockage detectors 23. The blockage removal unit 3 communicates with the chambers 221. The blockage removal unit 3 is connected to the processor 24. When the processor 24 judges that the transportation status of the lubricating oil of one of the chambers 221 is abnormal, the processor 24 activates the blockage removal unit 3 to remove the blockage.

The connection between the blockage removal unit 3 and the processor 24 can be wired or wireless.

The electric power of the present invention can be battery or city power.

Figure 2:
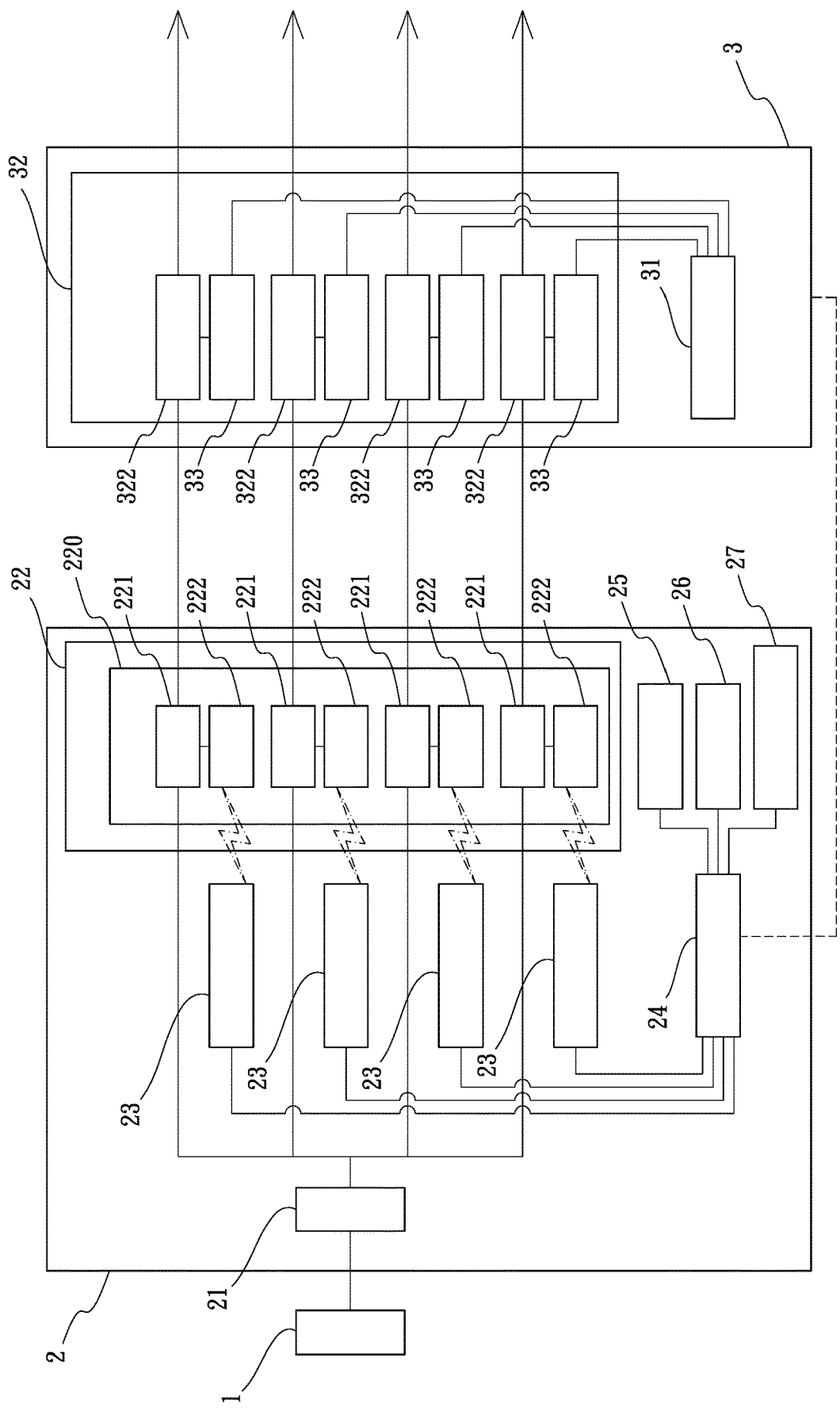
FIG. 2 shows the lubricator cooperated with the detecting unit and the blockage removal unit.

As shown in FIG. 2, the detecting unit 2 includes four chambers 221, and each chamber 221 includes a blockage detector 23. When the oil path of any one of the chambers 221 is blocked, the operator is acknowledged that the blockage is located in the specific chamber 221 by the blockage detector 23. There is no need to check the oil paths and chambers 221 one by one manually. For example, assume the blockage detector 23 is a pressure detector, when the pressure detector detects a pressure change, the processor 24 is able to judge which chamber 221 has problems of transportation of the lubricating oil. After the processor 24 judges that this is a blockage, the processor 24 activates the blockage removal unit 3 to remove the blockage.

The detection is automatically executed so that any blockage can be checked and removed immediately.

Figure 6:
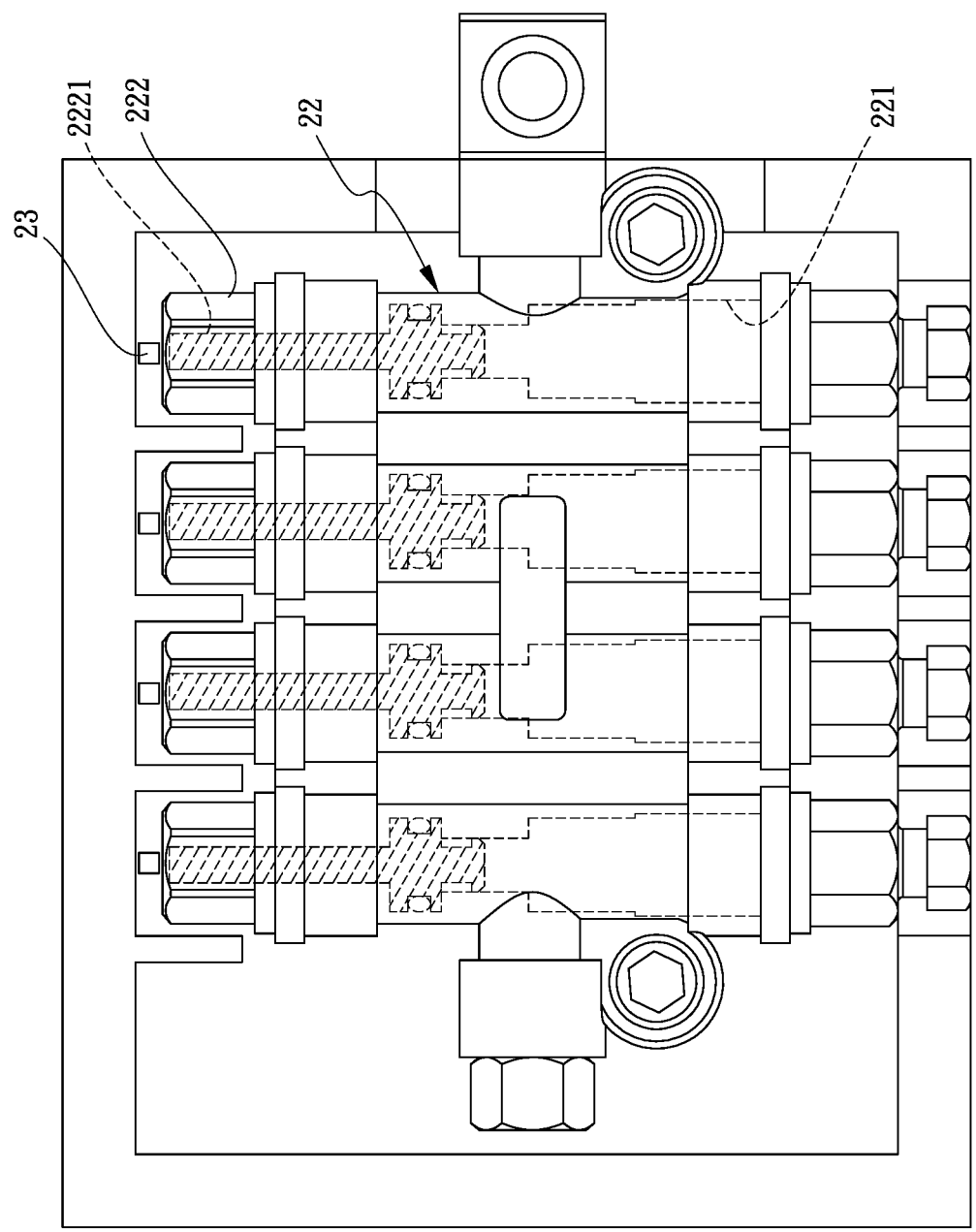
FIG. 6 is a plan view of the detecting unit of the present invention.
Figure 7:
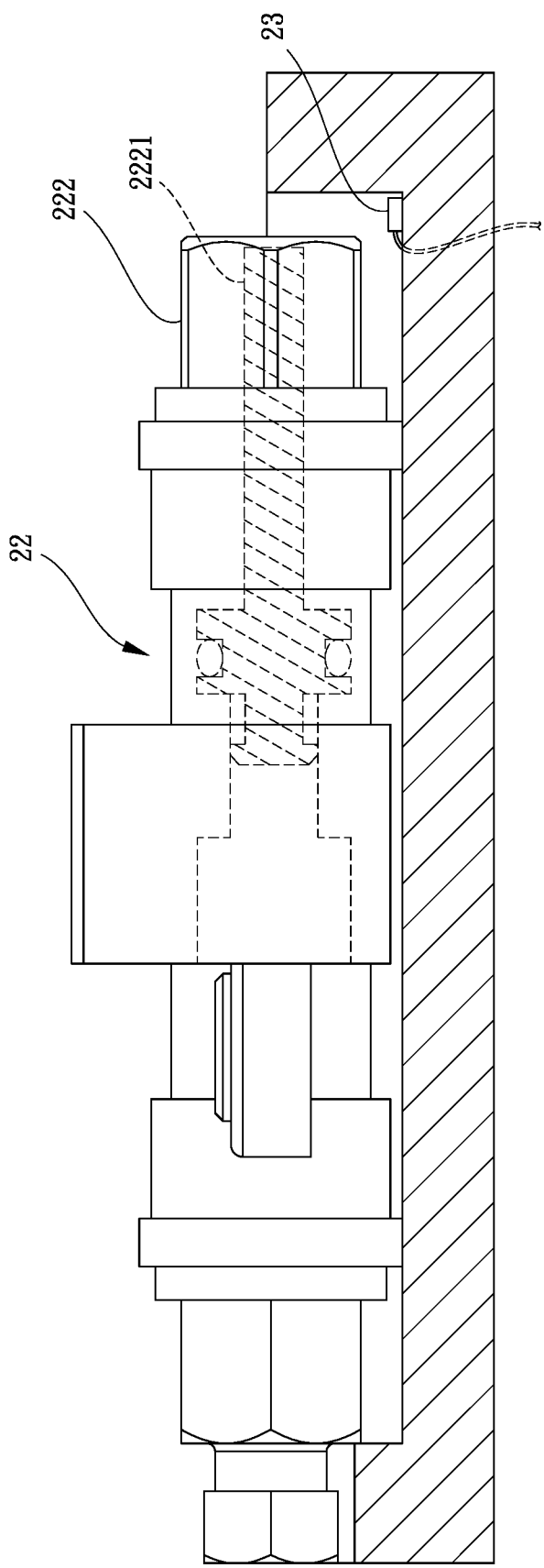
FIG. 7 is a cross sectional view, taken along line VII-VII in FIG. 5, wherein the rod is retracted.
Figure 8:
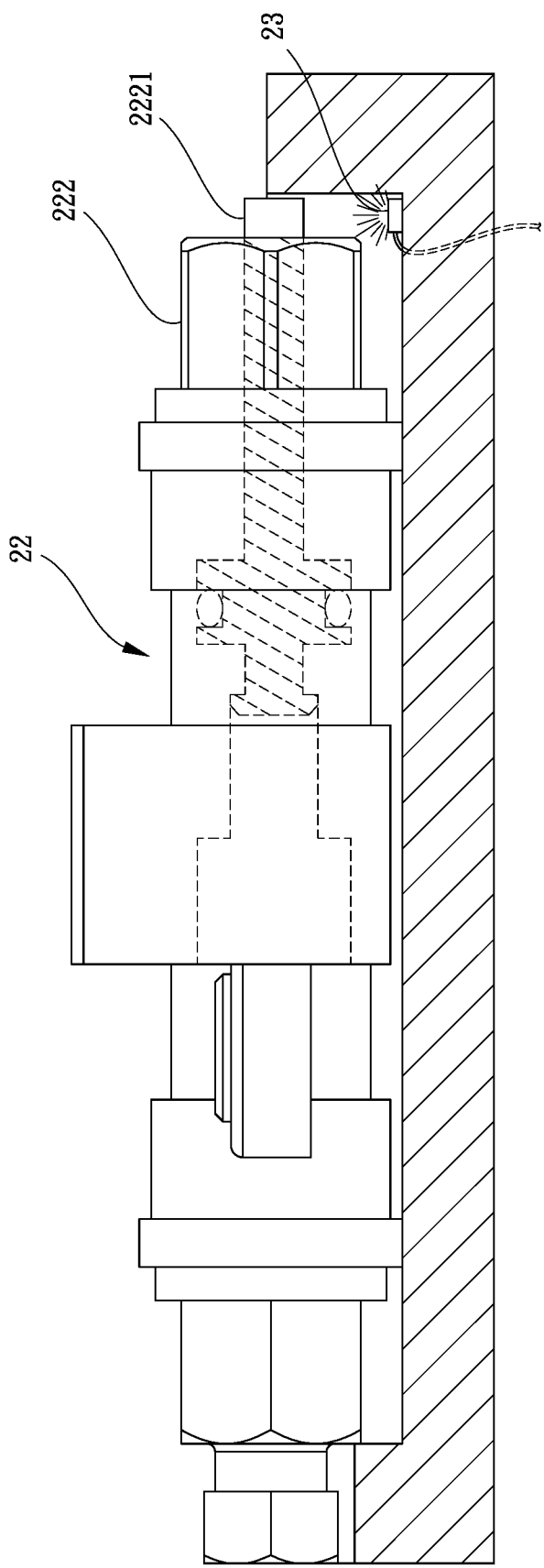
FIG. 8 shows that the rod is protruded beyond the chambers and is detected by the blockage detectors.

As shown in FIG. 2, the detecting unit 2 includes a volume distributor 22 which includes a case 220 and multiple valve heads 222. The chambers 221 are located in the case 220. The valve heads 222 are connected to the case 220 and respectively communicate with the chambers 221. Each valve head 222 includes a rod 2221 which moves beyond or retracts into the chambers 221 corresponding thereto. The blockage detectors 23 each located at a position to detect a frequency that each of the rods 2221 moves beyond the chamber 221. Specifically, as shown in FIGS. 6 to 8, the volume distributor shown in the figures is well known in the market. Assume the lubricator 1 supplies a certain amount of lubricating oil every 10 seconds, the rod 2221 is supposed to protrude beyond the chamber 221 every 10 seconds. If the blockage detector 3 does not detect the rod 2221 for 20 or 30 seconds, the processor 24 judges that the corresponding chamber 221 has a blockage, problem.

As shown in FIGS. 1 to 4, the blockage removal unit 3 includes an air compressor 31 and a box 32. The box 32 includes multiple air inlets 321 and multiple oil paths 322. A check valve 33 is connected between each air inlet 321 and each oil path 322. Each oil path 322 includes the first end thereof communicating with the chambers 221 of the detecting unit 2, and the second end of each oil path 322 includes an oil outlet 323. The oil outlet 323 is connected to the oil path of the machine. The way that the blockage removal unit 3 removes the blockage is to introduce high pressure air from the air compressor 31 into the oil path 322 so push the blockage away. The pressor 24 controls the valves of the air compressor 31 to introduce the high pressure air into the oil path 322. The check valve 33 restricts the high pressure air from flowing backward such that the lubricating oil does not flow back into the air compressor 31.

As shown in FIGS. 1 to 4, the processor 24 is electrically connected to the display 25 which displays the transportation status of the lubricating oil of the chambers 221 such that the operator can easily check the status of the chambers 221.

Furthermore, the processor 24 is electrically connected to a buzzer 26. When the processor 24 judges that the transportation status of the lubricating oil of one of the chambers 221 is abnormal, the buzzer 26 is activated by the processor 24.

In addition, the processor 24 is electrically connected to a wireless transmitter 27. When the processor 24 judges that the transportation status of the lubricating oil of one of the chambers 221 is abnormal, the wireless transmitter 27 is activated by the processor 24 to send a blockage signal to a linked computer, a smart phone or the like.

While we have shown and described the embodiment in accordance with the present invention, it should be clear to those skilled in the art that further embodiments may be made without departing from the scope of the present invention.

What is claimed is:

1. A lubrication system comprising:
a lubricator (1), and
a detecting unit (2) having an oil introducing part (21), a volume distributor (22) which includes a case (220) and multiple valve heads (222), multiple chambers (221) located in the case (220), multiple blockage detectors (23 and a processor (24), the valve heads (222) connected to the case (220) and respectively communicate with the chambers (221), each valve head (222) including a rod (2221) which moves beyond or retracts into the chambers (221), corresponding thereto, the blockage detectors (23) each located at a position to detect a frequency that each of the rods (2221) moves beyond the chamber (221), the oil introducing part (21) connected between the detecting unit (2) and the lubricator (1), the oil introducing part (21) communicating with the chambers (221), the blockage detectors (23) electrically connected to the processor (24) and monitoring transportation status of lubrication oil of the chambers (221), the processor (24) judging the transportation status of the lubricating oil of the chambers (221) by results from the blockage detectors (23).

2. The lubrication system as claimed in claim 1 further comprising a blockage removal unit (3) that communicates with the chambers (221), the blockage removal unit (3) connected to the processor (24), when the processor (24) judges that the transportation status of the lubricating oil of one of the chambers (22 is abnormal, the processor (24) activates the blockage removal unit (3).

3. The lubrication system as claimed in claim 2, wherein the blockage removal unit (3) includes an air compressor (31) and a box (32), the box (32) includes multiple air inlets) and multiple oil paths (322), a check valve (33) is connected between each air inlet (321) and each oil path (322), each oil path (322) includes a first end communicating with the chambers (221) of the detecting unit (2), a second end of each oil path (322) includes an oil outlet (323).

4. The lubrication system as claimed in claim 1, wherein the processor (24) is electrically connected to a display, (25) which displays the transportation status of the lubricating oil of the chambers (221).

5. The lubrication system as claimed in claim 1, wherein the processor (24) is electrically connected to a buzzer (26), when the processor (24) judges that the transportation status of the lubricating oil of one of the chambers (221) is abnormal, the buzzer (26) is activated by the processor (24).

6. The lubrication system as claimed in claim 1, wherein the processor (24) is electrically connected to a wireless transmitter (27), when the processor (24) judges that the transportation status of the lubricating oil of one of the chambers (221) is abnormal, the wireless transmitter is activated by the processor (24) to send a blockage signal.

7. A lubrication system comprising:
a lubricator (1);
a detecting unit (2) connected between the lubricator (1) and a blockage removal unit (3), the detecting unit (2) including an oil introducing part (21), multiple chambers (221), multiple blockage detectors (23) and a processor (24), the oil introducing part (21) connected between the detecting unit (2) and the lubricator (1), the oil introducing part (21) communicating with the chambers (221), the blockage detectors (23) electrically connected to the processor (24) and monitoring transportation status of lubrication oil of the chambers (221), the processor (24) judging the transportation status of the lubricating oil of the chambers (221) by results from the blockage detectors (23), and
the blockage removal unit communicating with the chambers (221) and connected to the processor (24), the blockage removal unit (3) including an air compressor (31) and a box (32), the box (32) including multiple air inlets (321) and multiple oil paths (322), a check valve (33) connected between each air inlet (321) and each oil path (322), each oil path (322) including a first end connected to lubricator (1), a second end of each oil path (322) including an oil outlet (323), when the processor (24) judges that the transportation status of the lubricating oil of one of the chambers (221) is abnormal, the processor (24) activates the blockage removal unit (3).

8. The lubrication system as claimed in claim 7, wherein the detecting unit (22) includes a volume distributor (22) which includes a case (220) and multiple valve heads (222), the chambers (221) are located in the case (220), the valve heads (222) are connected to the case (220) and respectively communicate with the chambers (221), each valve head (222) includes a rod (2221) which moves beyond or retracts into the chambers (221) corresponding thereto, the blockage detectors (23) each are located at a position to detect a frequency that each of the rods (2221 moves beyond the chamber (221).

9. The lubrication system as claimed in claim 7, wherein the processor (24) is electrically connected to a display (25) which displays the transportation status of the lubricating oil of the chambers (221).

10. The lubrication system as claimed in claim 7, wherein the processor (24) is electrically connected to a buzzer (26), when the processor (24) judges that the transportation status of the lubricating oil of one of the chambers (221) is abnormal, the buzzer (26) is activated by the processor (24).

11. The lubrication system as claimed in claim 7, wherein the processor (24) is electrically connected to a wireless transmitter (27), when the processor (24) judges that the transportation status of the lubricating oil of one of the chambers (221) is abnormal, the wireless transmitter (27) is activated by the processor (24) to send a blockage signal.

* * * * *